(12) United States Patent
Wada (10) Patent No.: US 7,373,021 B2
(45) Date of Patent: May 13, 2008

(54) IMAGE SEARCH PROGRAM, INFORMATION STORAGE MEDIUM, IMAGE SEARCH APPARATUS AND IMAGE SEARCH METHOD

(75) Inventor: Toshiaki Wada, Tama (JP)

(73) Assignee: Olympus Corporation, Tokyo (JP)

( * ) Notice: Subject to any disclaimer, the term of this patent is extended or adjusted under 35 U.S.C. 154(b) by 928 days.

(21) Appl. No.: 10/729,476

(22) Filed: Dec. 5, 2003

(65) Prior Publication Data

US 2005/0041886 A1   Feb. 24, 2005

(30) Foreign Application Priority Data

Dec. 9, 2002   (JP)   ............. 2002-357143

(51) Int. Cl.
*G06K 9/54* (2006.01)
(52) U.S. Cl. .................................... 382/305
(58) Field of Classification Search ............ None
See application file for complete search history.

(56) References Cited

U.S. PATENT DOCUMENTS 6,400,853 B1 * 6/2002 Shiiyama ............... 382/305

2002/0168117 A1 * 11/2002 Lee et al. ............... 382/305

FOREIGN PATENT DOCUMENTS

| JP | 10-289240 | 10/1998 |
|---|---|---|
| JP | 2002-140332 | 5/2002 |

* cited by examiner

*Primary Examiner*—Bhavesh M. Mehta
*Assistant Examiner*—Alex Liew
(74) *Attorney, Agent, or Firm*—Straub and Pokotylo; John C. Pokotylo (57) ABSTRACT

An image search program allowing a computer to execute a reference-image retrieving step of retrieving at least one second image selected from first images stored in a storage section, which is similar to a reference image, an image-displaying step of displaying an index image obtained by reducing the second image retrieved, an image-selecting step of causing a person who wants to retrieve images to select at least one third image similar to the reference image, in accordance with the index image displayed, and a symbol-providing step of storing symbols in data regions which are categories provided for the reference image, in association with the third image selected, each symbol representing similarity or dissimilarity.

12 Claims, 9 Drawing Sheets

IMAGE SEARCH PROGRAM, INFORMATION STORAGE MEDIUM, IMAGE SEARCH APPARATUS AND IMAGE SEARCH METHOD

CROSS-REFERENCE TO RELATED APPLICATIONS

This application is based upon and claims the benefit of priority from prior Japanese Patent Application No. 2002-357143, filed Dec. 9, 2002, the entire contents of which are incorporated herein by reference.

BACKGROUND OF THE INVENTION

1. Field of the Invention

The present invention relates to an image search technique for searching an image database storing images, for desired images.

2. Description of the Related Art

Known methods of searching for an image can be roughly classified into two types.

According to a first search method, images are provided with keywords that reflect the contents of the images. Then, during a search, an image provided with a keyword equivalent to one input by a user is extracted from an image database and presented to the user.

A problem with this search method is that the operation of providing each image with an appropriate keyword is not easy. Furthermore, if the user is different from the person who has provided the keywords, the reference keyword may not match the corresponding keyword used in the image database even though the two keywords are conceptually the same. Thus, this method may fail to search for appropriate images.

According to a second search method, a search is carried out utilizing attribute values that quantify the physical characteristics of images such as their colors, shapes, or textures. The attribute values of a reference image are compared with those of a searched image to extract a similar image from the image database. This image is then presented to the user as a search result.

With this method, since the attribute values extracted on the basis of a predetermined algorithm are not necessarily the same as those of an equivalent image human beings expect to obtain, the similarity between the searched image and the reference image may often be low in terms of human senses. Consequently, it has been pointed out that this method has a low detection accuracy.

To avoid these problems, the following technique has been proposed. For a set of images in a database which are provided with the same keyword, characteristic amount vectors and importance levels are determined. Then, the keyword is converted into an attributed value. The database is then searched for an image on the basis of this attribute value (Jpn. Pat. Appln. KOKAI Publication No. 2002-140332).

However, with this search method, images must be provided with keywords. Thus, much labor is required to provide the keywords. Furthermore, the distribution of the characteristic amount vectors of images with the same keyword is not ensured to be sufficiently localized on a characteristic space. Consequently, similar images cannot always be retrieved accurately.

As an alternative, the following technique has been proposed. A search is carried out using keywords assigned to images. Then, a similarity search is executed using the attribute values of images obtained results (Jpn. Pat. Appln. KOKAI Publication No. 10-289240).

However, this search method also uses keywords. It is a heavy burden to provide images with keywords. Moreover, images having the same keyword may have markedly different image attribute values. Accordingly, a decrease in search accuracy cannot always be avoided even though a search for a similar image is executed on the basis of attribute values.

BRIEF SUMMARY OF THE INVENTION

An image search program according to a first aspect of the present invention allows a computer to execute a symbol providing step of determining whether predetermined images are similar to or dissimilar from first images and storing symbols for each of the predetermined images in data regions which are categories, in association with one first image, each symbol representing similarity or dissimilarity, a reference-image retrieving step of retrieving some of the first images stored in a storage section, which are similar to a reference image, thereby retrieving primary selected images, an accumulating step of accumulating the values of the symbols stored in each category, for secondary selected images included in the primary selected images and being more similar to the reference image than the remaining primary selected images, a category selecting step of selecting some of the categories, each having accumulated a symbol value greater than the other categories, thereby selecting a first number of categories, and a symbol-provided image retrieving step of retrieving some of the first images having symbols representing similarity and stored in a second number of categories included in the first number of categories.

An image search program according to a second aspect of the present invention allows a computer to execute a reference-image retrieving step of retrieving at least one second image selected from first images stored in a storage section, which is similar to a reference image, an image-displaying step of displaying an index image obtained by reducing the second image retrieved, an image-selecting step of causing a person who wants to retrieve images to select at least one third image similar to the reference image, in accordance with the index image displayed, and a symbol-providing step of storing symbols in data regions which are categories provided for the reference image, in association with the third image selected, each symbol representing similarity or dissimilarity.

A storage medium according to the first aspect of the present invention stores a computer readable program allowing a computer to execute a symbol providing step of determining whether predetermined images are similar to or dissimilar from first images and storing symbols for each of the predetermined images in data regions which are categories, in association with one first image, each symbol representing similarity or dissimilarity, a reference-image retrieving step of retrieving some of the first images stored in a storage section, which are similar to a reference image, thereby retrieving primary selected images, an accumulating step of accumulating the values of the symbols stored in each category, for secondary selected images included in the primary selected images and being more similar to the reference image than the remaining primary selected images, a category selecting step of selecting some of the categories, each having accumulated a symbol value greater than the other categories, thereby selecting a first number of categories, and a symbol-provided image retrieving step of retrieving some of the first images having symbols representing similarity and stored in a second number of categories included in the first number of categories.

A storage medium according to the second aspect of the present invention stores a computer readable program allowing a computer to execute a reference-image retrieving step of retrieving at least one second image selected from first images stored in a storage section, which is similar to a reference image, an image-displaying step of displaying an index image obtained by reducing the second image retrieved, an image-selecting step of causing a person who wants to retrieve images to select at least one third image similar to the reference image, in accordance with the index image displayed, and a symbol-providing step of storing symbols in data regions which are categories provided for the reference image, in association with the third image selected, each symbol representing similarity or dissimilarity.

An image search apparatus according to the first aspect of the present invention comprises a symbol providing section which determines whether predetermined images are similar to or dissimilar from first images and stores symbols for each of the predetermined images in data regions which are categories, in association with one first image, each symbol representing similarity or dissimilarity, a reference-image retrieving section which retrieves some of the first images stored in a storage section, which are similar to a reference image, thereby retrieves primary selected images, an accumulating section which accumulates the values of the symbols stored in each category, for secondary selected images included in the primary selected images and being more similar to the reference image than the remaining primary selected images, a category selecting section which selects some of the categories, each having accumulated a symbol value greater than the other categories, thereby selects a first number of categories, and a symbol-provided image retrieving section which retrieves some of the first images having symbols representing similarity and stored in a second number of categories included in the first number of categories.

An image search apparatus according to the second aspect of the present invention comprises a reference-image retrieving section which retrieves at least one second image selected from first images stored in a storage section, which is similar to a reference image, an image-displaying section which displays an index image obtained by reducing the second image retrieved, an image-selecting section which causes a person who wants to retrieve images to select at least one third image similar to the reference image, in accordance with the index image displayed, and a symbol-providing section which stores symbols in data regions which are categories provided for the reference image, in association with the third image selected, each symbol representing similarity or dissimilarity.

An image search method according to the first aspect of the present invention comprises a symbol providing step of determining whether predetermined images are similar to or dissimilar from first images and storing symbols for each of the predetermined images in data regions which are categories, in association with one first image, each symbol representing similarity or dissimilarity, a reference-image retrieving step of retrieving some of the first images stored in a storage section, which are similar to a reference image, thereby retrieving primary selected images, an accumulating step of accumulating the values of the symbols stored in each category, for secondary selected images included in the primary selected images and being more similar to the reference image than the remaining primary selected images, a category selecting step of selecting some of the categories, each having accumulated a symbol value greater than the other categories, thereby selecting a first number of categories, and a symbol-provided image retrieving step of retrieving some of the first images having symbols representing similarity and stored in a second number of categories included in the first number of categories.

An image search method according to the second aspect of the present invention comprises a reference-image retrieving step of retrieving at least one second image selected from first images stored in a storage section, which is similar to a reference image, an image-displaying step of displaying an index image obtained by reducing the second image retrieved, an image-selecting step of causing a person who wants to retrieve images to select at least one third image similar to the reference image, in accordance with the index image displayed, and a symbol-providing step of storing symbols in data regions which are categories provided for the reference image, in association with the third image selected, each symbol representing similarity or dissimilarity.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
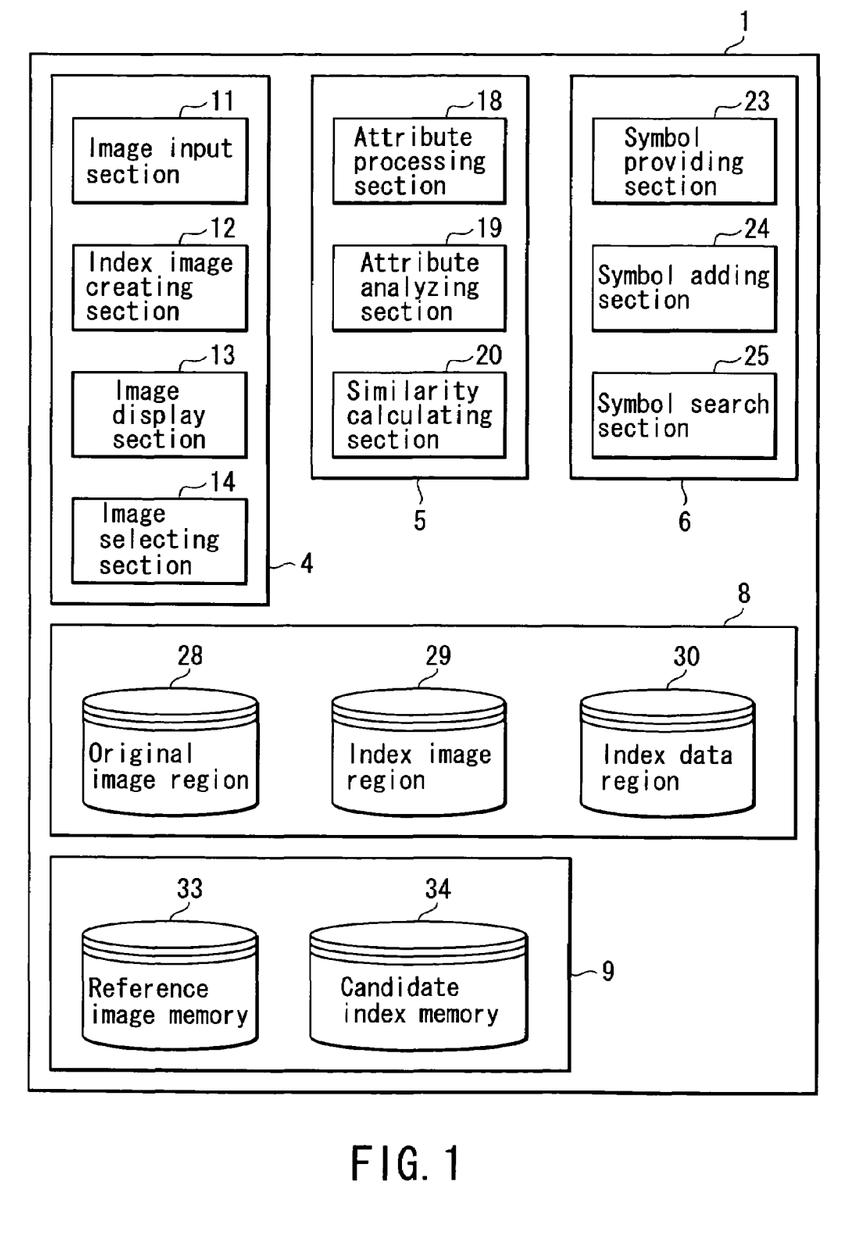
FIG. 1 is a block diagram showing the configuration of an image search apparatus to which an image search method according to the present invention is applied.

FIG. 1 is a block diagram showing the configuration of an image search apparatus to which an image search method according to the present invention is applied. An image to be searched for will hereinafter be referred to as an "original image".

An image search apparatus 1 includes an image processing section 4, an attribute processing section 5, a symbol processing section 6, an image database 8, and a buffer memory 9.

The image processing section 4 deals with image data. The attribute processing section 5 deals with attribute data on images. The symbol processing section 6 deals with a symbol indicating whether or not an image belongs to a certain category. The image database 8 is a storage region for original images. The buffer memory 9 is a storage region for other data.

The image processing section 4 is provided with an image input section 11, an index image creating section 12, an image display section 13, and an image selecting section 14.

The image input section 11 loads an original image from an image input apparatus (not shown) into the image search apparatus 1. The index image creating section 12 creates an index image that is a reduced image of the original image stored in the image database 8. The image display section 13 displays the index image or the original image on a display device (not shown). The image selecting section 14 supports an image selecting operation performed by a user.

The attribute processing section 5 is provided with an attribute processing section 18, an attribute analyzing section 19, and a similarity calculating section 20.

The attribute processing section 18 determines attribute values for an original image. The attribute analyzing section 19 belongs to the attribute processing section 18 and extracts various attribute values from the original image. The similarity calculating section 20 calculates an index for determining whether or not images are similar to each other, on the basis of the attribute values.

The symbol processing section 6 is provided with a symbol providing section 23, a symbol adding section 24, and a symbol searching section 25.

The symbol providing section 23 provides the same symbol to all the original images selected by the image selecting section 14 when determining that the original images are similar to a reference image on the basis of an index image displayed on the image display section 13. If the original image is similar to the reference image, then for the reference image, for example, "1" is provided at a particular digit of data associated with the original image. If the original image is not similar to the reference image, for example, "0" is provided to the same digit of the data. The symbol adding section 24 executes a symbol adding calculation on the plurality of original images. The image searching section 25 searches for an original image with a predetermined symbol indicating "1".

The image database 8 is provided with an original image region 28, an index image region 29, and an index data region 30.

The original image area 28 stores original images to be searched for. The index image region 29 stores index images obtained by reducing the sizes of original images. The index data region 30 stores the original images, addresses used to access the index images, information on the original images such as their attribute values.

The buffer memory 9 comprises a reference image memory 33 storing reference images used as references for image searches and a candidate index memory 34 storing, for example, the storage addresses of original images selected in an intermediate stage of a search.

Now, operations of the present image search apparatus 1 will be described.

As an operation performed in a preparation stage, a user registers original images in the image search apparatus 1.

Figure 2:
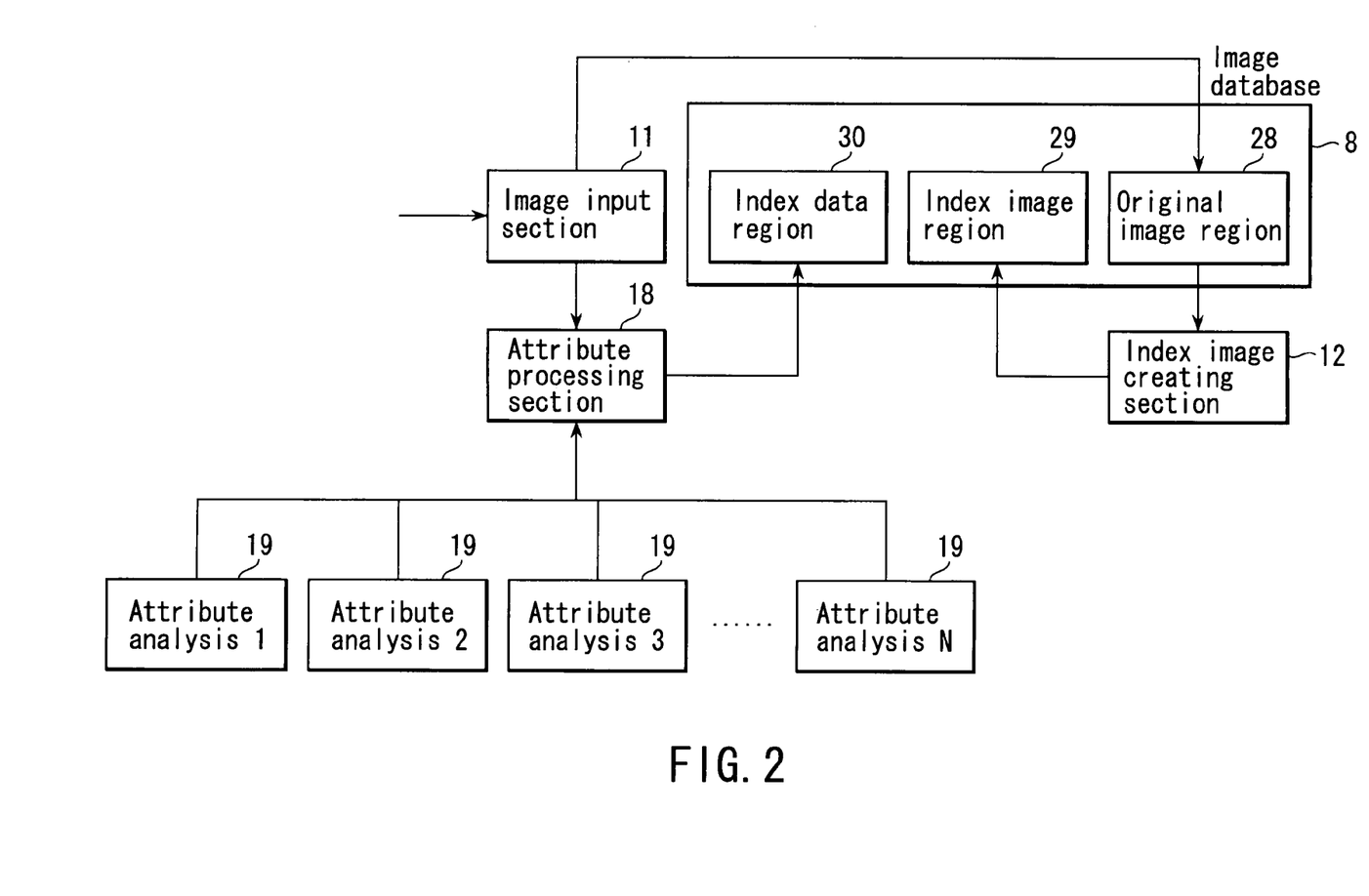
FIG. 2 is a diagram showing associations among functions of the image search apparatus which are used to register original images.
Figure 3:
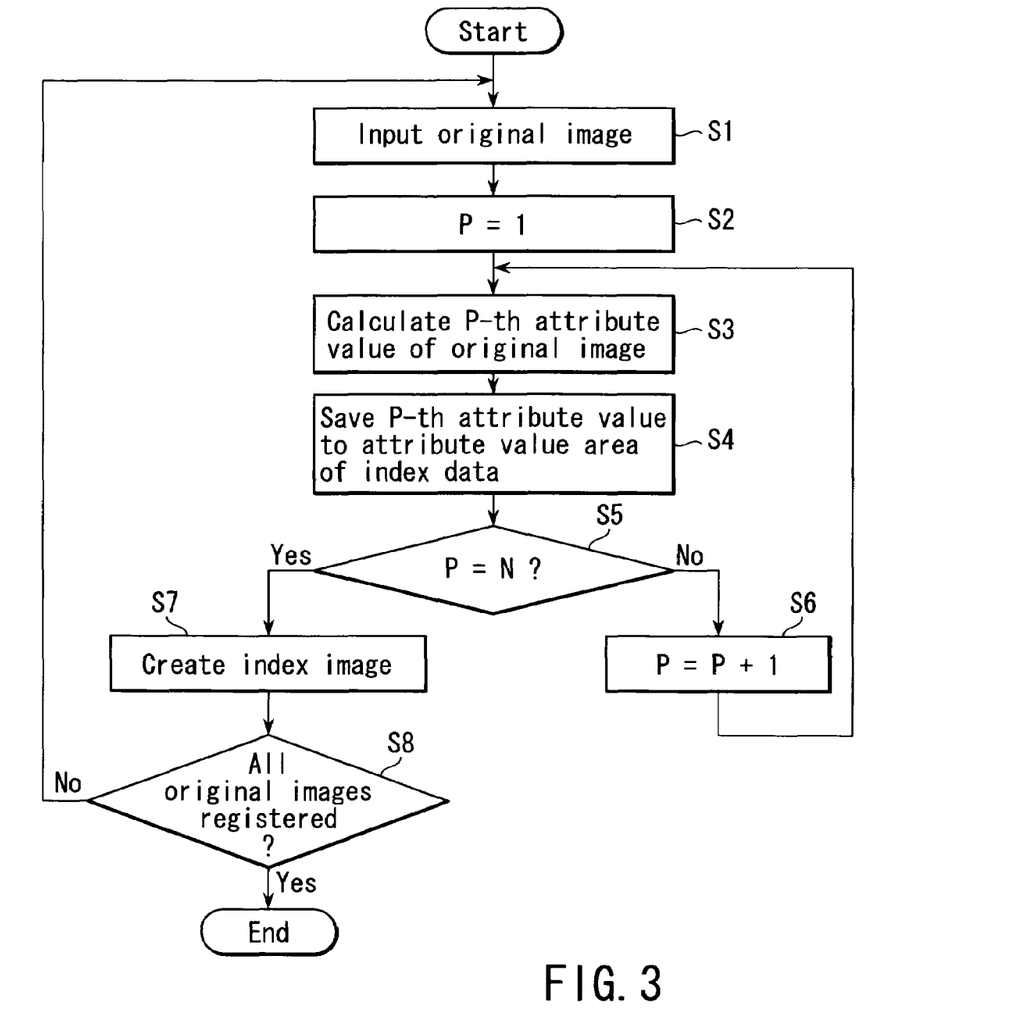
FIG. 3 is a flowchart schematically showing a process procedure used to register original images.

FIG. 2 is a diagram showing associations among functions of the image search apparatus which are used to register original images. FIG. 3 is a flowchart schematically showing a process procedure used to register original images.

At step S1, the image input section 11 loads the original images from the image input apparatus (not shown). Then, the image input section 11 stores the loaded original images in the original image region 28 of the image database 8. The image input section 11 activates the attribute processing section 18.

At step S2, the attribute processing section 18 sets an initial value "1" to a control variable P, and activate the P-th attribute analyzing section 19.

At step S3, the P-th attribute analyzing section 19 determines the P-th attribute value for the loaded original images. Here, the attribute values of the original images include numerical data items representing colors, shapes, textures, and the like expressed in the original images. Accordingly, the attribute values as used herein refer to amounts expressed by quantification for physical components such as colors and shapes and textures are not values based on sensuous elements based on human subjectivities.

At step S4, the attribute processing section 18 stores the attribute values P determined by the P-th attribute analyzing section 19, in an attribute value area of index data 37 saved in the index data region 30.

Figure 4:
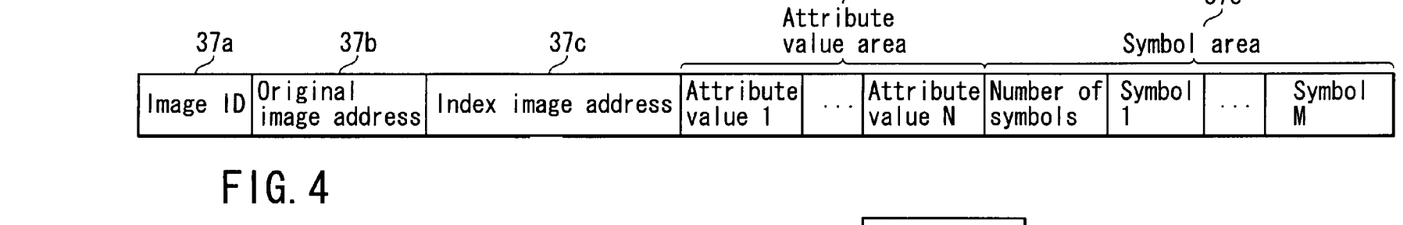
FIG. 4 is a diagram showing the configuration of index data.

FIG. 4 is a diagram showing the configuration of the index data 37.

The index data 37 is provided with an image ID 37a, an original image address 37b, an index image region address 37c, an attribute value area 37d, and a symbol area 37e.

The image ID 37a identifies an original image. The original image address 37b stores an address in the original image area 28 at which the original image is stored. The index image region address 37c stores an address in the index image region 29 at which an index image that is a reduced image of the original image is stored. The attribute area 37d stores a plurality of attribute values of the original image. The symbol area 37e stores a symbol for a category provided to the original image as well as the total number of symbols.

Here, the "category" refers to a data region used to identify an image determined by the user to be visually the same as a certain image. The category is defined for each reference image, described later. When the original image belongs to the J-th category, this means that it is visually similar to the J-th reference image presented by a requester. In this case, a "symbol J" in the symbol area 37e is 1.

At step S5, it is checked whether or not a predetermined number N of attribute values have all been determined. If the result of the check in step S5 is No, that is, the predetermined number N of attribute values have not been determined, then at step S6, the control variable P is counted up. Then, the processing in steps S3 to S4 is repeated.

If the result of the check in step S5 is Yes, that is, the predetermined number N of attribute values have been determined, then at step S7, the index image creating section 12 creates an index image that is a reduced image of the original image. The index image creating section 12 stores the index image in the index image region 29 and updates the index image address 37c of the index data 37.

At step S8, it is checked whether or not all the original images have been registered. If the result of the check in step S8 is No, that is, there remain any images to be registered, then the processing in steps S1 to S7 is repeated.

If the result of the check in step S8 is Yes, that is, all the images have been registered, the image registering process is ended. All the original images need not be registered at a time but the registration of an original image may be repeated.

Subsequently, the user provides a symbol to each of the original images registered in the image search apparatus 1. Here, the "symbol" used in the present invention is a concept which is similar to a conventional keyword but is broader and higher than the keyword. That is, the keyword represents a characteristic of an image on the basis of a "word". However, the "symbol" does not conceptualize the image using a word, but groups it on the basis of its visual identity. When images are determined to be the same, they are said to belong to the same category, with "1" stored in the same digit in the symbol area 37. The digits in the symbol area 37e other than the one indicating the number of symbols represent the respective categories.

Figure 5:
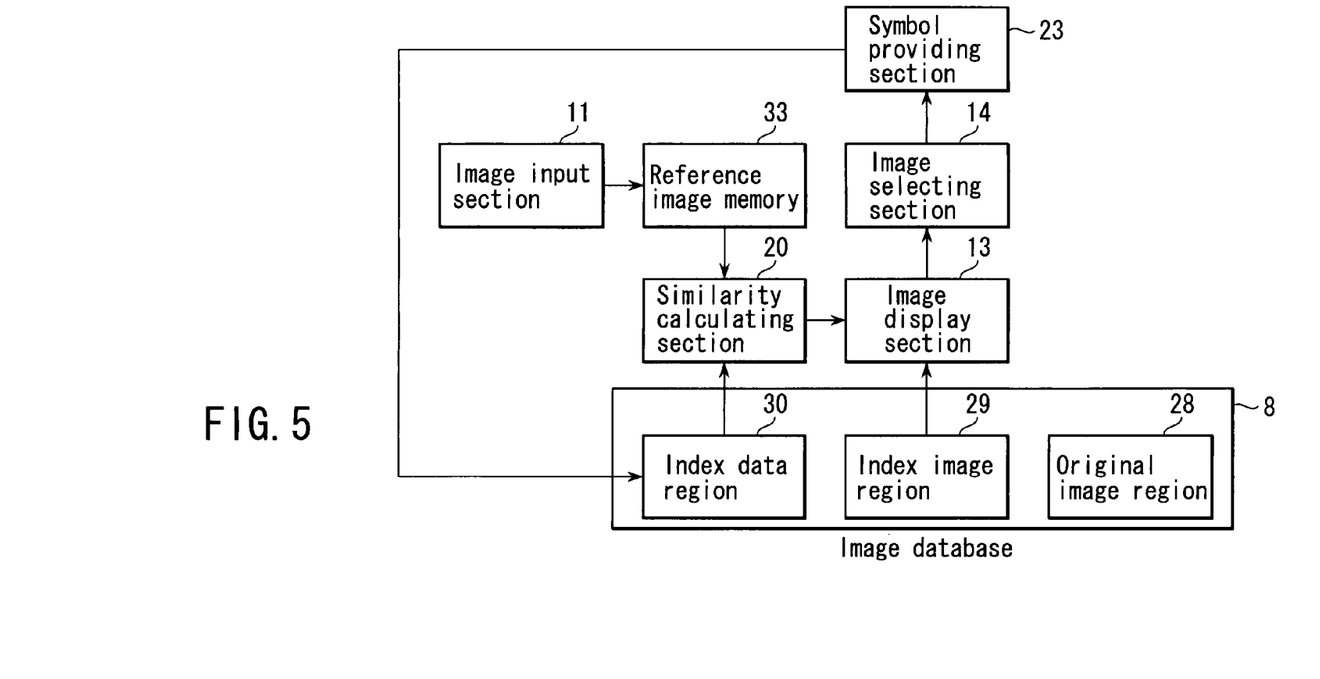
FIG. 5 is a diagram showing associations among functions of the image search apparatus which are used to provide a symbol to an original image.
Figure 6:
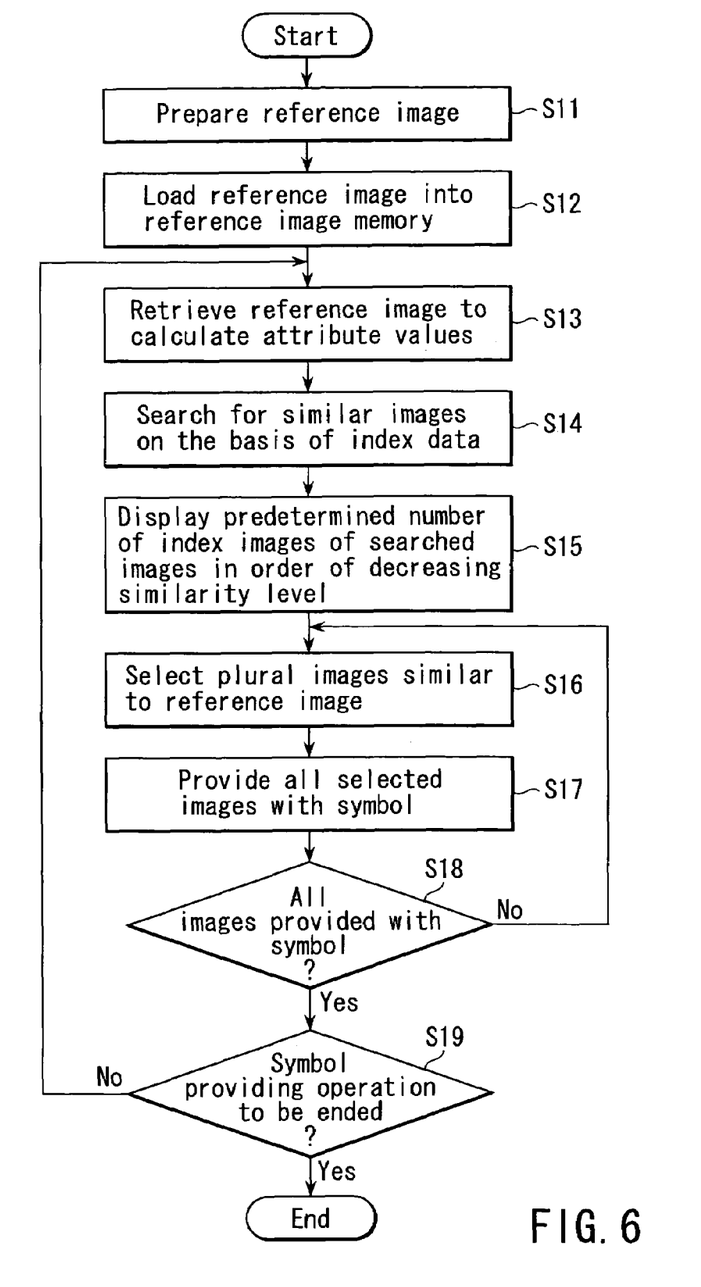
FIG. 6 is a flowchart schematically showing a process procedure used to provide a symbol to an original image.

FIG. 5 is a diagram showing associations among functions of the image search apparatus which are used to provide a symbol to an original image. FIG. 6 is a flowchart schematically showing a process procedure used to provide a symbol to an original image.

At step S11, the user prepares a reference image used as a reference for providing a symbol to each original image. Here, the reference image replaces the conventional keyword. The process described below provides the original image with a symbol indicating whether or not it is similar to the reference image.

At step S12, the image input section 11 loads the reference image from the image input apparatus (not shown). Then, the image input section 11 stores the loaded reference image in the reference image memory 33 of the buffer memory 9.

At step S13, the similarity calculating section 20 retrieves the reference image from the reference image memory 33. The similarity calculating section 20 then calculates the previously described attribute values for the reference image. That is, in accordance with the procedure in steps S3 and S4, described previously, the similarity calculating section 20 obtains a plurality of attribute values processed by the attribute analyzing section 19.

At step S14, the similarity calculating section 20 identifies original images similar to the reference image on the basis of the index data 37 stored in the index data region 30. Similarity is determined by comparing the reference image with the original image for a plurality of attribute values 1 to M. For example, the original image can be determined to be similar to the reference image if a function is set which uses the attribute values 1 to M as parameters and if the reference image and the original image have similar function values.

At step S15, the image display section 13 retrieves the index images of the original images sequentially identified in the order of decreasing similarity level, from the index image region 29. The image display section 13 then displays a predetermined number of index images on a display device (not shown). The image display section 13 then outputs an instruction urging the user to make selection.

At step S16, the user views the displayed index images, determines any of the original images to be similar to the reference image, and selects them. The user may select one or more images. Alternatively, the user may choose not to select any original images. The image selecting section 14 supports the selecting operation performed by the user and loads information on the selected image.

At step S17, the symbol providing section 23 provides a symbol in the symbol area 37e of the index data 37 for the selected original image.

Figure 7:
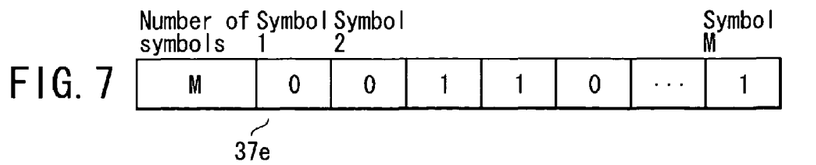
FIG. 7 is a diagram showing the configuration of a symbol area.

FIG. 7 is a diagram showing the configuration of the symbol area 37e. The symbol providing section 23 adds 1 to the "number of symbols" in the symbol area 37e for the selected original image, to obtain M. The symbol providing section 23 also describes a number "1" at the position of a newly provided "symbol M". Furthermore, the symbol providing section 23 adds 1 to the "number of symbols" in the symbol area 37e for the original image which has not been selected, to obtain M. The symbol providing section 23 describes a number "0" at the position of a newly provided "symbol M".

At step S18, if one type of reference image can be provided with a plurality of symbols, it is checked whether or not all the symbols have been provided.

Even with one type of reference image, if the image contains a plurality of subjects, then the respective subjects can be provided with different marks. Furthermore, even if the image contains only one subject, it can be provided with a plurality of symbols by varying the viewpoint. For example, one subject can be provided with a plurality of symbols by considering its color and form to be different features. Then, if the result of the check in step S18 is No, the processing in steps S16 and S17 is repeated.

If the result of the check in step S18 is Yes, then at step S19, it is checked whether or not the symbol providing operation has been finished. For example, it is checked whether or not the symbol providing process has been finished for all the reference images.

If the result of the check in step S19 is No, that is, there remain any reference images to be processed, the processing in steps S13 to S17 is repeated. If the result of the check in step S19 is Yes, that is, the symbol providing process has been finished for all the reference images.

In the present embodiment, the symbols "1" and "0" are used. However, the present invention is not limited to this aspect. The symbols may be letters or special symbols and need not particularly be meaningful. Furthermore, it is unnecessary to know what reference images the symbols 1 to M indicate. In this point, the present invention essentially differs from the keyword system, in which each keyword requires a particular meaning and content.

Furthermore, the present embodiment is characterized in that similarity is not only quantitatively determined on the basis of the attribute values but the result for similarity to the reference image subjectively determined by the user is loaded as a symbol. In general, the similarity of images depends significantly on subjective elements. Then, by configuring the present image search apparatus 1 so that similarity is determined on the basis of not only mechanical determinations based on digitized data but also the user's determinations, it is possible to provide results similar to the subjectivity of the user using the present image search apparatus 1.

Moreover, in the present embodiment, each time a reference image is loaded and a symbol providing process is executed, the number described in the "number of symbols", shown in FIG. 7 is incremented by one. Then, the data area used to provide the symbol, that is, the category increases. This means that the symbol information characterizing images grows as more reference images are loaded. Consequently, it is expected that search accuracy increases consistently with the number of times the image search apparatus is used.

On the other hand, the present embodiment is characterized by using no keywords. However, steps S11 to S17 can be applied to keyword provisions for the conventional keyword search. By providing the same keyword to the images selected in steps S11 to S16, it is possible to provide keywords more easily than in the case in which each image is provided with a keyword.

Now, description will be given of an image search method according to a first embodiment of the present invention.

Figure 8:
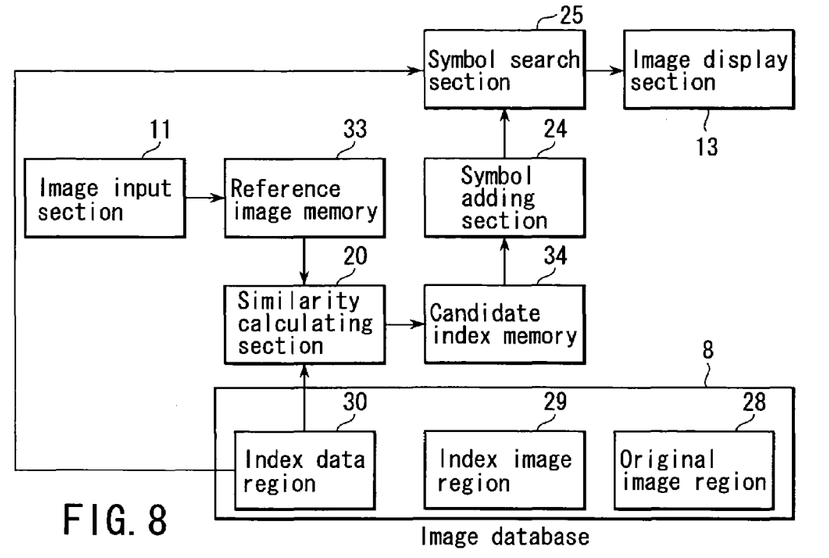
FIG. 8 is a diagram showing associations among functions of an image search method according to a first embodiment.
Figure 9:
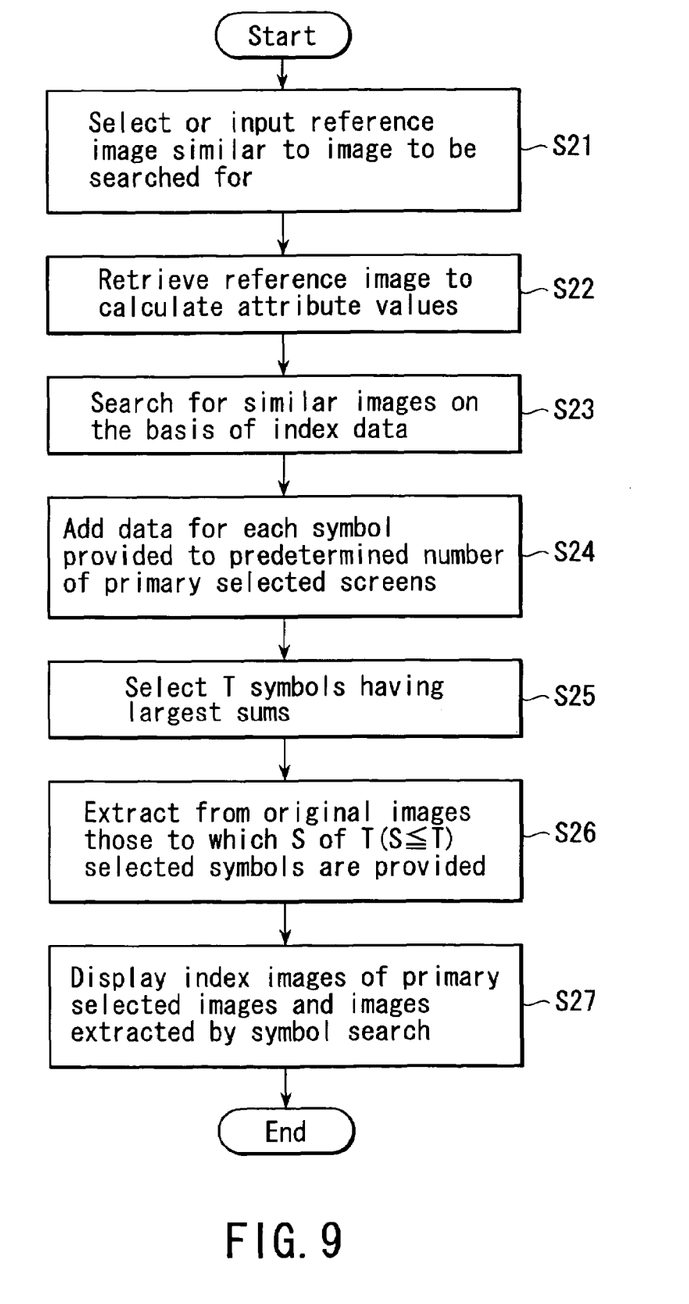
FIG. 9 is a flowchart schematically showing the process procedure of the image search method according to the first embodiment.

FIG. 8 is a diagram showing associations among functions of the image search method according to the first embodiment. FIG. 9 is a flowchart schematically showing the process procedure of the image search method according to the first embodiment.

At step S21, the user prepares a reference image similar to an image to be searched for. The image input section 11 loads the reference image from the image input apparatus (not shown). Then, the image input section 11 stores the loaded reference image in the reference image memory 33 of the buffer memory 9. Instead of being loaded from the image input apparatus (not shown), the reference image may be selected from those already stored in the reference image memory 33. Alternatively, any of the original images stored in the original image region 28 may be selected as a reference image.

At step S22, the similarity calculating section 20 retrieves the reference image from the reference image memory 33. The similarity calculating section 20 then calculates the previously described attribute values for the reference image. That is, in accordance with the procedure in steps S3 and S4, described previously, the similarity calculating section 20 obtains a plurality of attribute values processed by the attribute analyzing section 19.

At step S23, the similarity calculating section 20 identifies original images similar to the reference image on the basis of the index data 37 stored in the index data region 30.

Similarity is determined on the basis of the magnitude of similarity determined as a function of a plurality of attribute values 1 to N for each of the reference and original images. For example, the attribute values 1 to N of the reference image are combined together to obtain an attribute vector V for the reference image. Likewise, an attribute vector Uh is determined for the h-th original image. Then, a similarity level Dh is calculated using Equation (1).

$$Dh=(Uh-V) \cdot (Uh-V) \quad (1)$$

Dh in Equation (1) denotes the square of the Euclidean distance between the attribute vectors of the h-th original image and the attribute vector of the reference image, and is an index for similarity. That is, the similarity level increases with decreasing distance.

Furthermore, by weighting each characteristic amount to calculate the distance to obtain an attribute value, it is possible to correct the difference in characteristic (for example, color and shape) between the attribute values to obtain a more appropriate similarity index.

In this case, a weight vector indicating the weight applied to each characteristic amount is defined as W. Then, the similarity level Dh is expressed by Equation (2).

$$Dh=(W*Uh-W*V) \cdot (W*Uh-W*V) \quad (2)$$

The weight may be the inverse of the variance of each attribute value sample determined from a large number of sample images.

The operator "·" indicates the inner product of vectors shown in Equation (3).

$$W \cdot V = W1 \times V1 + W2 \times V2 + \ldots + WN \times VN \quad (3)$$

The operator "*" is a vector operator that generates a vector with elements composed of values obtained by multiplying respective elements of each of the two vectors by different weights.

$$W*V=(W1 \times V1, W2 \times V2, \ldots, WN \times VN) \quad (4)$$

Then, the similarity calculating section 20 sequentially sorts the index data 37 on the plurality of identified original images (hereinafter referred to as "primary selected images") in the order of decreasing similarity level. The similarity calculating section 20 then stores the index data 37 in the candidate index memory 34 as candidate index data.

At step S24, the symbol adding section 24 retrieves the index data 37 from the candidate index memory 34, for the K most similar ones of the primary selected images. Then, the symbol adding section 24 adds up all the data provided to the same symbol in the symbol area 37e. In the present embodiment, the data is "1" or "0".

Figure 10:
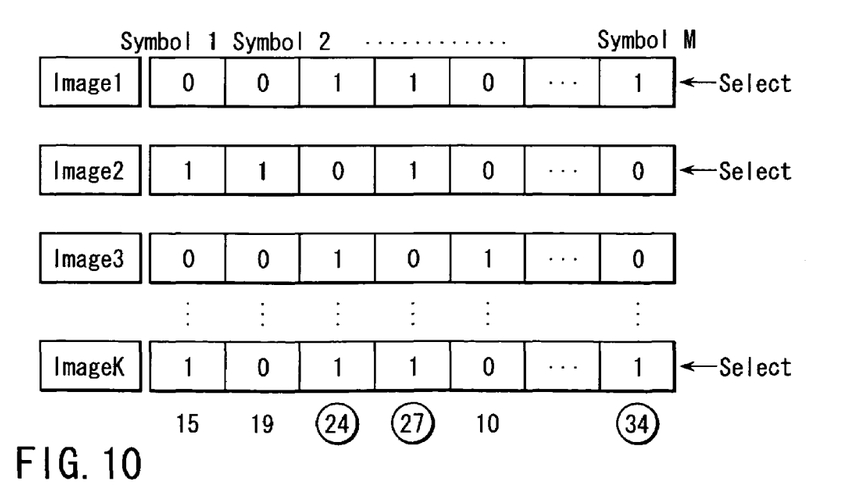
FIG. 10 is a diagram illustrating an adding method.

FIG. 10 is a diagram illustrating an adding method.

FIG. 10 shows the symbol area 37e, corresponding to the K most similar original images Image 1 to K. The symbol adding section 24 adds data for each of the symbols 1 to M. That is, for each of the symbols 1 to M, the number of original images similar to the category represented by that symbol is determined. The results of the additions are shown at the bottom of FIG. 10.

At step S25, the symbol adding section 24 selects T symbols having the largest values as a result of the addition. If T=3, the symbols 3, 4, and M are selected as shown in FIG. 10.

This means that the original images determined to be very similar to the reference image often comprise the characteristics indicated by the symbols 3, 4, and M. That is, the original images comprising the characteristics indicated by the symbols 3, 4, and M are presumably likely to be similar to the reference image.

At step S26, the symbol searching section 25 searches for original images for which at least S of the T selected symbols are "1", on the basis of the index data 33. The images searched for on the basis of the symbols are those of the original images which have not been selected as the primary elected images. That is, in addition to the original images selected on the basis of the attribute values, the original images searched for on the basis of the symbols are extracted as images similar to the reference image. The method of thus selecting images on the basis of symbols is called a symbol search method.

At step S27, the image display section 13 displays index images of the primary selected images and of the images extracted using the symbol search method, on the display device (not shown) as search results.

According to the search method of the first embodiment, the attribute-value-based search and the symbol search are combined together to search for similar images. This enables the search accuracy to be increased. That is, the search based on attribute values determines similarity on the basis of physical components such as colors and shapes. Accordingly, human beings do not always find similarity in similar images selected using only the above references. Thus, by also applying the symbol search method of determining similarity utilizing sensuous elements based on human subjectivities, it is possible to reduce failures to detect similar images to improve the search accuracy.

Now, description will be given of an image search method according to a second embodiment according to the present invention.

Figure 11:
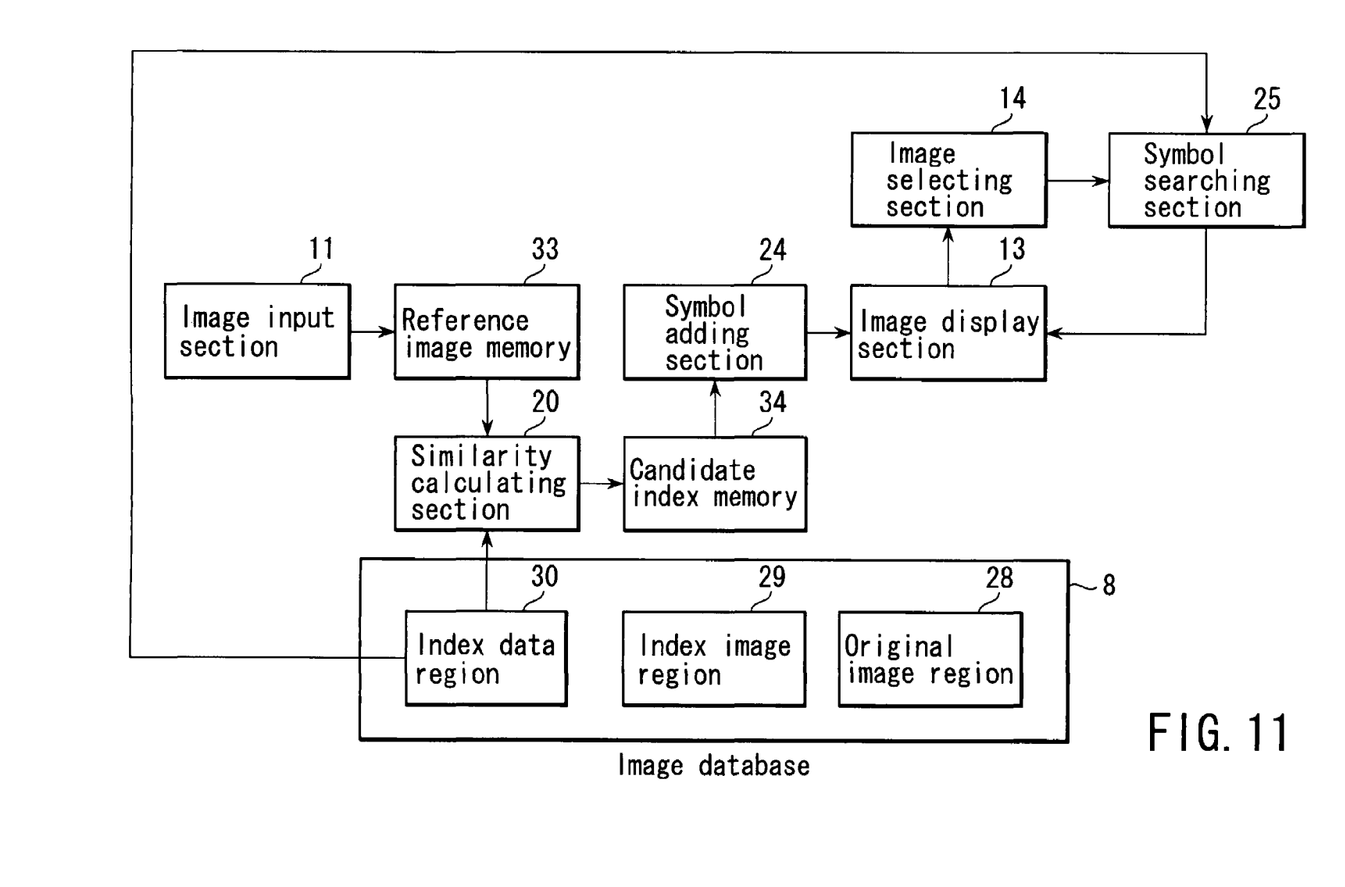
FIG. 11 is a diagram showing associations among functions of an image search method according to a second embodiment.
Figure 12:
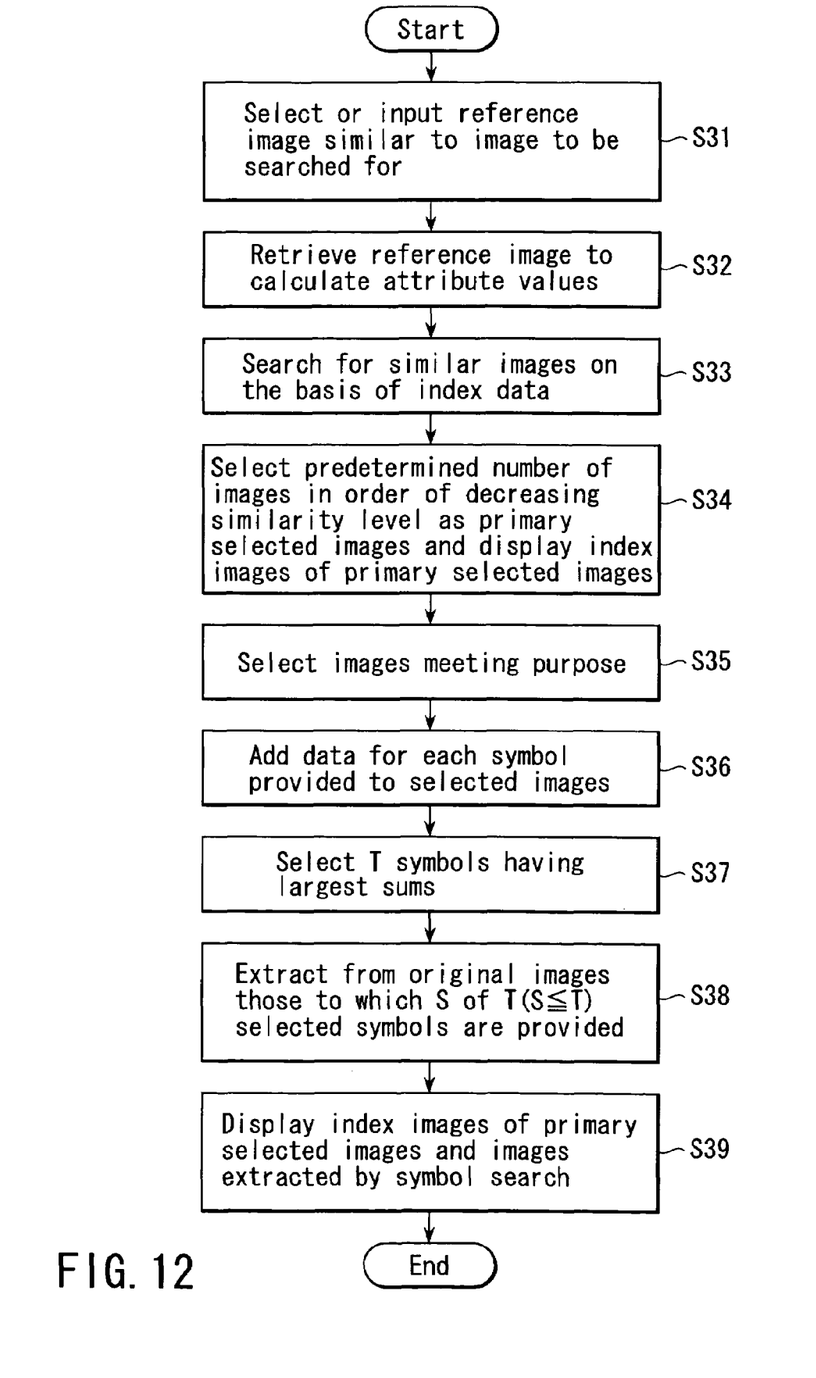
FIG. 12 is a flowchart schematically showing the process procedure of the image search method according to the second embodiment.

FIG. 11 is a diagram showing associations among functions of the image search method according to the second embodiment. FIG. 12 is a flowchart schematically showing the process procedure of the image search method according to the second embodiment.

At step S31, the user prepares a reference image similar to an original image to be searched for. The image input section 11 loads the reference image from the image input apparatus (not shown). Then, the image input section 11 stores the loaded reference image in the reference image memory 33 of the buffer memory 9. Instead of being loaded from the image input apparatus (not shown), the reference image may be selected from those already stored in the reference image memory 33. Alternatively, any of the original images stored in the original image region 28 may be selected as a reference image.

At step S32, the similarity calculating section 20 retrieves the reference image from the reference image memory 33. The similarity calculating section 20 then calculates the previously described attribute values for the reference image. That is, in accordance with the procedure in steps S3 and S4, described previously, the similarity calculating section 20 obtains a plurality of attribute values processed by the attribute analyzing section 19.

At step S33, the similarity calculating section 20 identifies original images similar to the reference image on the basis of the index data 37 stored in the index data region 30. Similarity is determined in a manner similar to that used in the first embodiment.

Then, the similarity calculating section 20 sequentially sorts the index data 37 on the plurality of identified primary selected images in the order of decreasing similarity level. The similarity calculating section 20 then stores the index data 37 in the candidate index memory 34.

At step S34, the image display section 13 displays index images of the primary selected images on the display device (not shown) as search results.

At step S35, the user views the displayed index images, determines a plurality of images (one or zero image may also be possible) to be similar to the reference image, and selects them. The image selecting section 14 supports the selecting operation performed by the user and loads information on the selected image.

At step S36, the symbol adding section 24 retrieves the index data 37 from the candidate index memory, for the original images selected by the user. Then, the symbol adding section 24 adds up all the data provided to the same symbol in the symbol area 37e. The adding method is similar to the one used in the first embodiment. Accordingly, its detailed description is omitted.

At step S37, the symbol adding section 24 selects T symbols having the largest values as a result of the addition.

At step S38, the symbol searching section 25 searches for original images for which at least S of the T selected symbols are "1", on the basis of the index data 33. The images searched for on the basis of the symbols are those of the original images which have not been selected as the primary elected images.

At step S39, the image display section 13 displays index images of the primary selected images and of the original images extracted using the symbol search, on the display device (not shown) as search results.

According to the search method of the second embodiment, similar images are selected from primary selected images on the basis of human subjectivities. Then, the symbol search method is applied on the basis of the selected images. This further improves the accuracy of the search for similar images based on the symbol search.

As described above, according to the present embodiment, the concept of the "symbol" is introduced. Accordingly, required labor can be sharply reduced compared to the conventional operation of providing keywords. Furthermore, the provided symbols need not be keywords. This avoids troubling the user about selecting keywords during a search. Moreover, the symbol search is used with the conventional method of searching for similar images. This improves the accuracy of the search for similar images.

The functions described in the above described embodiments cannot only be configured using hardware but can also be implemented by using software to load programs describing the functions into a computer. Alternatively, the functions may be configured by properly selecting software or hardware.

Moreover, the functions can be implemented by loading programs stored in a storage medium (not shown), into a computer. Here, the storage medium according to the present embodiment may use any storage form provided that it can store programs and that a computer can read data from it.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A storage medium which stores a computer readable program allowing a computer to execute:
   a symbol providing step of determining whether predetermined images are similar to or dissimilar from first images and storing symbols for each of the predetermined images in data regions which are categories, in association with one first image, each symbol representing similarity or dissimilarity;
   a reference-image retrieving step of retrieving some of the first images stored in a storage section, which are similar to a reference image, thereby retrieving primary selected images;
   an accumulating step of accumulating the values of the symbols stored in each category, for secondary selected images included in the primary selected images and being more similar to the reference image than the remaining primary selected images;
   a category selecting step of selecting some of the categories, each having accumulated a symbol value greater than the other categories, thereby selecting a first number of categories; and
   a symbol-provided image retrieving step of retrieving some of the first images having symbols representing similarity and stored in a second number of categories included in the first number of categories.

2. The storage medium which stores a computer readable program according to claim 1, wherein the symbol providing step includes:
    a second reference-image retrieving step of retrieving at least one second image selected from first images stored in the storage section, which is similar to the predetermined image;
    an image-displaying step of displaying an index image obtained by reducing the second image retrieved;
    an image-selecting step of causing a person who wants to retrieve images to select at least one third image similar to the predetermined image from the index image displayed; and
    a symbol-storing step of storing symbols in data regions which are categories provided for the predetermined image, in association with the third image selected, each symbol representing similarity or dissimilarity.

3. An image search apparatus comprising:
    a symbol providing section which determines whether predetermined images are similar to or dissimilar from first images and stores symbols for each of the predetermined images in data regions which are categories, in association with one first image, each symbol representing similarity or dissimilarity;
    a reference-image retrieving section which retrieves some of the first images stored in a storage section, which are similar to a reference image, thereby retrieves primary selected images;
    an accumulating section which accumulates the values of the symbols stored in each category, for secondary selected images included in the primary selected images and being more similar to the reference image than the remaining primary selected images;
    a category selecting section which selects some of the categories, each having accumulated a symbol value greater than the other categories, thereby selects a first number of categories; and
    a symbol-provided image retrieving section which retrieves some of the first images having symbols representing similarity and stored in a second number of categories included in the first number of categories.

4. The image search apparatus according to claim 3, wherein the symbol providing section includes:
    a second reference-image retrieving section which retrieves at least one second image selected from first images stored in a storage section, which is similar to the predetermined image;
    an image-displaying section which displays an index image obtained by reducing the second image retrieved;
    an image-selecting section which causes a person who wants to retrieve images to select at least one third image similar to the predetermined image from the index image displayed; and
    a symbol-storing section which stores symbols in data regions which are categories provided for the predetermined image, in association with the third image selected, each symbol representing similarity or dissimilarity.

5. An image search method comprising:
    a symbol providing step of determining whether predetermined images are similar to or dissimilar from first images and storing symbols for each of the predetermined images in data regions which are categories, in association with one first image, each symbol representing similarity or dissimilarity;
    a reference-image retrieving step of retrieving some of the first images stored in a storage section, which are similar to a reference image, thereby retrieving primary selected images;
    an accumulating step of accumulating the values of the symbols stored in each category, for secondary selected images included in the primary selected images and being more similar to the reference image than the remaining primary selected images;
    a category selecting step of selecting some of the categories, each having accumulated a symbol value greater than the other categories, thereby selecting a first number of categories; and
    a symbol-provided image retrieving step of retrieving some of the first images having symbols representing similarity and stored in a second number of categories included in the first number of categories.

6. The image search method according to claim 5, wherein the symbol providing step includes:
    a second reference-image retrieving step of retrieving at least one second image selected from first images stored in a storage section, which is similar to the predetermined image;
    an image-displaying step of displaying an index image obtained by reducing the second image retrieved;
    an image-selecting step of causing a person who wants to retrieve images to select at least one third image similar to the predetermined image from the index image displayed; and
    a symbol-storing step of storing symbols in data regions which are categories provided for the predetermined image, in association with the third image selected, each symbol representing similarity or dissimilarity.

7. The storage medium which stores a computer readable program according to claim 1,
    wherein the accumulating step accumulates the values of the symbols stored in each category, for the secondary selected images extracted in the order the descending order of similarity to the reference image, in accordance with attributes values of the corresponding primary selected images.

8. The storage medium which stores a computer readable program according to claim 1,
    wherein the accumulating step accumulates the values of the symbols stored in each category, for the secondary selected images extracted in the order the descending order of similarity to the reference image, said secondary selected images being images that a person who wants to retrieve images has selected in accordance with index images obtained by reducing the primary selected images.

9. The storage medium which stores a computer readable program according to claim 1,
    wherein the reference-image retrieving step has a step of determining whether each of the first images is similar to or dissimilar from the reference image, in accordance with the attribute values of the first image and the attribute value of the reference image.

10. The storage medium which stores a computer readable program according to claim 1,
    wherein the reference image is an image selected from the first images or an image input by a person who wants to retrieve images.

11. The storage medium which stores a computer readable program according to claim 2,
wherein the second reference-image retrieving step has a step of determining whether each of the first images is similar to or dissimilar from the predetermined image, in accordance with the attribute values of the first image and the attribute value of the reference image.

12. The storage medium which stores a computer readable program according to claim 2,
wherein the predetermined image is an image selected from the first images or an image input by a person who wants to retrieve images.

* * * * *